(12) United States Patent
Narita

(10) Patent No.: US 10,989,568 B2
(45) Date of Patent: Apr. 27, 2021

(54) POSITION DETECTION DEVICE AND POSITION DETECTION METHOD

(71) Applicant: SONY CORPORATION, Tokyo (JP)

(72) Inventor: Tetsuya Narita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/489,907

(22) PCT Filed: Mar. 1, 2018

(86) PCT No.: PCT/JP2018/007826
§ 371 (c)(1),
(2) Date: Aug. 29, 2019

(87) PCT Pub. No.: WO2018/190019
PCT Pub. Date: Oct. 18, 2018

(65) Prior Publication Data
US 2020/0003585 A1    Jan. 2, 2020

(30) Foreign Application Priority Data

Apr. 13, 2017 (JP) .............................. JP2017-079611

(51) Int. Cl.
*G01D 5/245* (2006.01)
*G01B 7/30* (2006.01)
(Continued)

(52) U.S. Cl.
CPC ........... *G01D 5/2452* (2013.01); *G01B 7/003* (2013.01); *G01B 7/30* (2013.01); *G01D 5/2449* (2013.01); *G01D 5/24476* (2013.01)

(58) Field of Classification Search
None
See application file for complete search history.

(56) References Cited

U.S. PATENT DOCUMENTS 6,466,889 B1    10/2002   Schödlbauer
6,935,193 B2    8/2005    Heisenberg et al.
(Continued)

FOREIGN PATENT DOCUMENTS

JP    2003-083768 A    3/2003
JP    2007-327770 A    12/2007
(Continued)

OTHER PUBLICATIONS

Tan et al. ("New Interpolation Method for Quadrature Encoder Signals", IEEE Transactions on Instrumentation and Measurement, vol. 51, No. 5, 2002, p. 1073-1079). (Year: 2002).*

(Continued)

*Primary Examiner* — Roy Y Yi
(74) *Attorney, Agent, or Firm* — Paratus Law Group, PLLC

(57) ABSTRACT

There is provided a position detection device to suppress an influence of a signal distortion due to a processing error, an assembly error of a sensor, or the like. The position detection device includes: a waveform correction unit that corrects waveforms of a first signal and a second signal, the first signal being detected from a first track provided on a moving body and having a scale of predetermined cycles, and the second signal being detected from a second track provided on the moving body and having a scale of cycles less than the predetermined cycles; and a position calculation unit that calculates a position of the moving body on the basis of the corrected first signal and second signal.

36 Claims, 11 Drawing Sheets

(51) Int. Cl.
 *G01D 5/244* (2006.01)
 *G01B 7/00* (2006.01)

(56) References Cited

U.S. PATENT DOCUMENTS

| | | | |
|---|---|---|---|
| 9,347,802 B2 | 5/2016 | Horiguchi | |
| 2002/0041241 A1 | 4/2002 | Oberhauser | |
| 2011/0147572 A1 | 6/2011 | Nakamura | |
| 2015/0076332 A1* | 3/2015 | Nagura | G01D 5/3473 |
| | | | 250/231.13 |
| 2015/0160427 A1 | 6/2015 | Miyashita | |
| 2015/0171999 A1 | 6/2015 | Cho et al. | |

FOREIGN PATENT DOCUMENTS

| | | |
|---|---|---|
| JP | 2009-025176 A | 2/2009 |
| JP | 2010-145203 A | 7/2010 |
| JP | 2013-096813 A | 5/2013 |
| JP | 2014-124000 A | 7/2014 |
| JP | 2015-121405 A | 7/2015 |
| JP | 2015-194462 A | 11/2015 |
| WO | WO 2014/034317 A1 | 3/2014 |

OTHER PUBLICATIONS

Jun. 29, 2020, European Search Report issued for related EP application No. 18784419.6.

* cited by examiner

Track A (VOLTAGE WAVEFORM)

Track B (VOLTAGE WAVEFORM)

| MECHANICAL ANGLE | DIFFERENCE |
|---|---|
| 0 | 0.05 |
| 0.1 | 0.13 |
| ⋮ | ⋮ |
| 359.8 | 0.03 |
| 359.9 | 0.16 |

CORRECTION TABLE

TrackA TrackB TrackC

500

ANGLE CALCULATION UNIT CALCULATED ANGLE ⇒

| MECHANICAL ANGLE | DIFFERENCE |
|---|---|
| 0 | 0.05 |
| 0.1 | 0.13 |
| ⋮ | ⋮ |
| 359.8 | 0.03 |
| 359.9 | 0.16 |

⇒ ERROR

FIG. 10

INTERPOLATION ANGLE: $\theta_{interp} = \text{atan2}(\cos_A, \sin_A)$

| MECHANICAL ANGLE | DIFFERENCE |
|---|---|
| 0 | 0.05 |
| 0.1 | 0.13 |
|  | V2 |
|  | V1 |
|  | V3 |
| 359.9 | 0.16 |

$$\text{ERROR} = \frac{V1+V2+V3}{3}$$

Track A: 64 CYCLES
Track B: 63 CYCLES

IN CASE WHERE NUMBER OF TEETH OF Track A IS 64

ANGLE IN Slit (INTERPOLATION ANGLE) IS CALCULATED

INTERPOLATION ANGLE ($\theta_{interp}$)

arctan2()

$\theta_{interp} = \text{atan2}(\cos_A, \sin_A)$

SHOW INTERPOLATION ANGLE IN ONE Slit (IN RANGE OF MECHANICAL ANGLE OF 5.625deg)

64 CYCLES

INTERPOLATION ANGLE ($\theta_{interp}$)

MECHANICAL ANGLE

POSITION DETECTION DEVICE AND POSITION DETECTION METHOD

CROSS REFERENCE TO PRIOR APPLICATION

This application is a National Stage Patent Application of PCT International Patent Application No. PCT/JP2018/007826 (filed on Mar. 1, 2018) under 35 U.S.C. § 371, which claims priority to Japanese Patent Application No. 2017-079611 (filed on Apr. 13, 2017), which are all hereby incorporated by reference in their entirety.

TECHNICAL FIELD

The present disclosure relates to a position detection device and a position detection method.

BACKGROUND ART

Conventionally, for example, Patent Document 1 discloses an absolute encoder having a scale unit having at least a main track, a first address track, and a second address track and processing means detecting a phase difference from the scale unit, performing address determination on the basis of a plurality of detected phase differences, and calculating a position or an angle of a target to be measured.

CITATION LIST

Patent Document

Patent Document 1: Japanese Patent Application. Laid-Open No. 2013-96813

SUMMARY OF THE INVENTION

Problems to be Solved by the Invention

However, in the technology described in the above Patent Document, when detecting the phase difference from the scale unit, a phase modulation signal corresponding to a detection signal of a sensor is output, but there is a problem that an angle accuracy decreases since it is affected by a signal distortion due to a processing error of the scale unit, an assembly error of the sensor, or the like.

Therefore, it has been required to suppress an influence of the signal distortion due to the processing error, the assembly error of the sensor, or the like.

Solutions to Problems

According to the present disclosure, there is provided a position detection device including: a waveform correction unit that corrects waveforms of a first signal and a second signal, the first signal being detected from a first track provided on a moving body and having a scale of predetermined cycles, and the second signal being detected from a second track provided on the moving body and having a scale of cycles less than the predetermined cycles; and a position calculation unit that calculates a position of the moving body on the basis of the corrected first signal and second signal.

Furthermore, according to the present, disclosure, there is provided a position detection device including: a first interpolation angle calculation unit that calculates a first interpolation angle from a first signal detected from a first track provided on a moving body and having a scale of predetermined cycles; a second interpolation angle calculation unit that calculates a second interpolation angle from a second signal detected from a second track provided on the moving body and having a scale of cycles less than the predetermined cycles; a first position calculation unit that calculates a position of the moving body on the basis of the first interpolation angle and the second interpolation angle; an interpolation angle correction unit that corrects the first interpolation angle and the second interpolation angle on the basis of the position of the moving body; and a second position calculation unit that calculates a position of the moving body on the basis of the corrected first interpolation angle and second interpolation angle.

Furthermore, according to the present disclosure, there is provided a position detection method including: correcting waveforms of a first signal and a second signal, the first signal being detected from a first track provided on a moving body and having a scale of predetermined cycles, and the second signal being detected from a second track provided on the moving body and having a scale of cycles less than the predetermined cycles; and calculating a position of the moving body on the basis of the corrected first signal and second signal.

Furthermore, according to the present disclosure, there is provided a position detection method including: calculating a first interpolation angle from a first signal detected from a first track provided on a moving body and having a scale of predetermined cycles; calculating a second interpolation angle from a second signal detected from a second track provided on the moving body and having a scale of cycles less than the predetermined cycles; calculating a position of the moving body on the basis of the first interpolation angle and the second interpolation angle; correcting the first interpolation angle and the second interpolation angle on the basis of the position of the moving body; and calculating a position of the moving body on the basis of the corrected first interpolation angle and second interpolation angle.

Effects of the Invention

As described above, according to the present disclosure, it is possible to suppress an influence of a signal distortion due to a processing error, an assembly error of a sensor, or the like.

Note that the effect described above is not necessarily restrictive, and any effect set forth in the present specification or other effects that can be grasped from the present specification may be accomplished together with or instead of the effect described above.

BRIEF DESCRIPTION OF DRAWINGS

FIG. 10 is a schematic view illustrating a method of acquiring a correction value by an interpolation angle.

MODE FOR CARRYING OUT THE INVENTION

Figure 1:
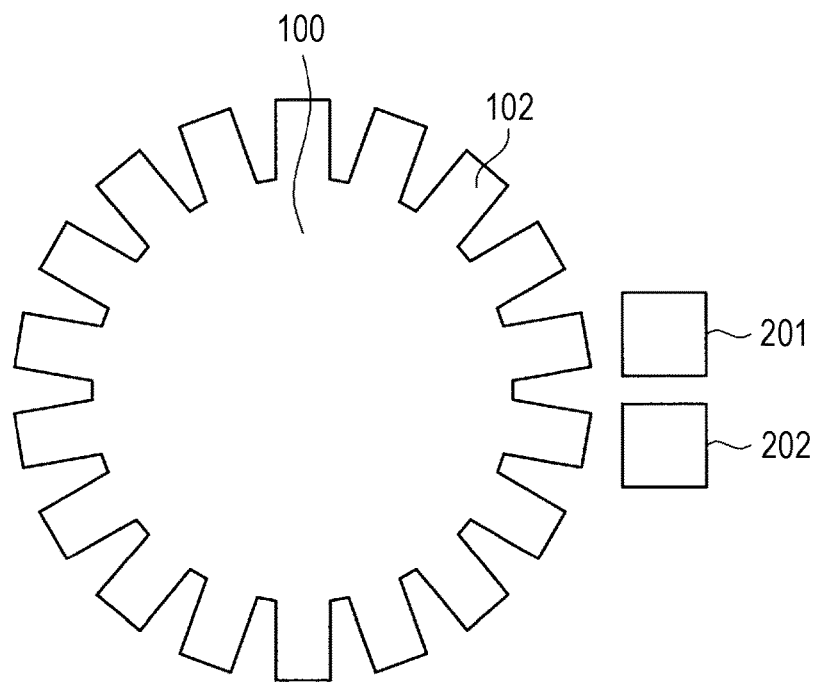
FIG. 1 is a schematic view illustrating a configuration of an encoder which is a premise of the present disclosure.

Hereinafter, preferred embodiments of the present disclosure will be described in detail with reference to the accompanying drawings. Note that in the present specification and the drawings, components having substantially the same functional configuration will be denoted by the same reference numerals and an overlapping description will be omitted.

Note that a description will be given in the following order.

1. Premise Technology
2. Configuration Example of Position Detection Device According to Present Embodiment
3. Method of Acquiring Correction Value by Interpolation Angle
4. Configuration Example of Repeating Waveform Correction and Angle Calculation
5. Configuration Example of Correcting interpolation Angle
6. Configuration Example in Case of Three Tracks
1. Premise Technology FIG. 1 is a schematic view illustrating a configuration of an encoder (position detection device) which is a premise of the present disclosure. The encoder includes a rotating body (moving body) 100, a detection unit 201, and a detection unit 202.

The rotating body 100 is configured as, for example, a rotating body having a gear shape or a ruggedness or a rotating body in which N poles and S poles are alternately magnetized. The detection unit 201 and the detection unit 202 detect changes in magnetism, light, and the like due to rotation of the rotating body 100.

The rotating body 100 illustrated in FIG. 1 includes eighteen projections 102, and outputs eighteen cycles of signal when it rotates once. Note that the rotating body 100 in which the projections 102 are arranged in a circumferential direction and rotate with respect to a rotation center is illustrated in FIG. 1, but the projections 102 may be arranged in a Linear shape. The present embodiment can be applied to an encoder detecting a rotation angle in a case where the projections 102 are arranged in the circumferential direction, and can be applied to a linear encoder in a case where the projections 102 are arranged in the linear shape.

Examples of the detection units 201 and 202 can include a magnetic sensor, a light receiving element and the like. The present embodiment is applicable to various encoders such as a magnetoresistive encoder, a magnetic (magnetization) encoder, an electric induction type encoder, and an optical encoder.

Figure 2:
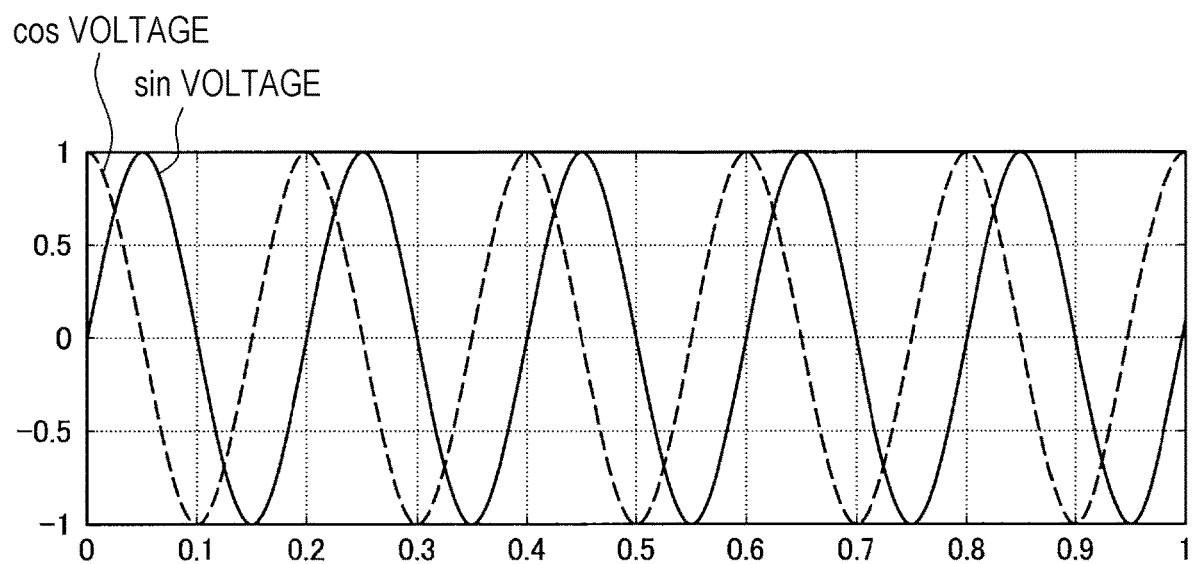
FIG. 2 is a schematic view illustrating output signals of detection units.

FIG. 2 is a schematic view illustrating output signals of the detection unit 201 and the detection unit 202. As illustrated in FIG. 2, two sinusoidal voltage signals (referred to as a sin voltage and a cos voltage) having a phase difference of 90° therebetween are obtained by the detection units 201 and 202, from one track of the rotating body 100. In other words, the detection units 201 and 202 are arranged at positions where the sin voltage and the cos voltage having the phase difference of 90° therebetween are obtained. A cycle of each of the sin voltage and the cos voltage is the same as the number of projections 102 of the rotating body 100. If the number of sets of the detection unit 201 and the detection unit 202 increases, the number of obtained signals also increases. Each of the sin voltage and the cos voltage is obtained by converting a change in a physical quantity detected by the detection unit 201 and the detection unit 202 when the rotating body 100 rotates into a voltage. For example, in a case of a magnetic encoder, a change in a magnetic flux density is converted into a voltage by the detection unit 201 and the detection unit 202.

Figure 3:
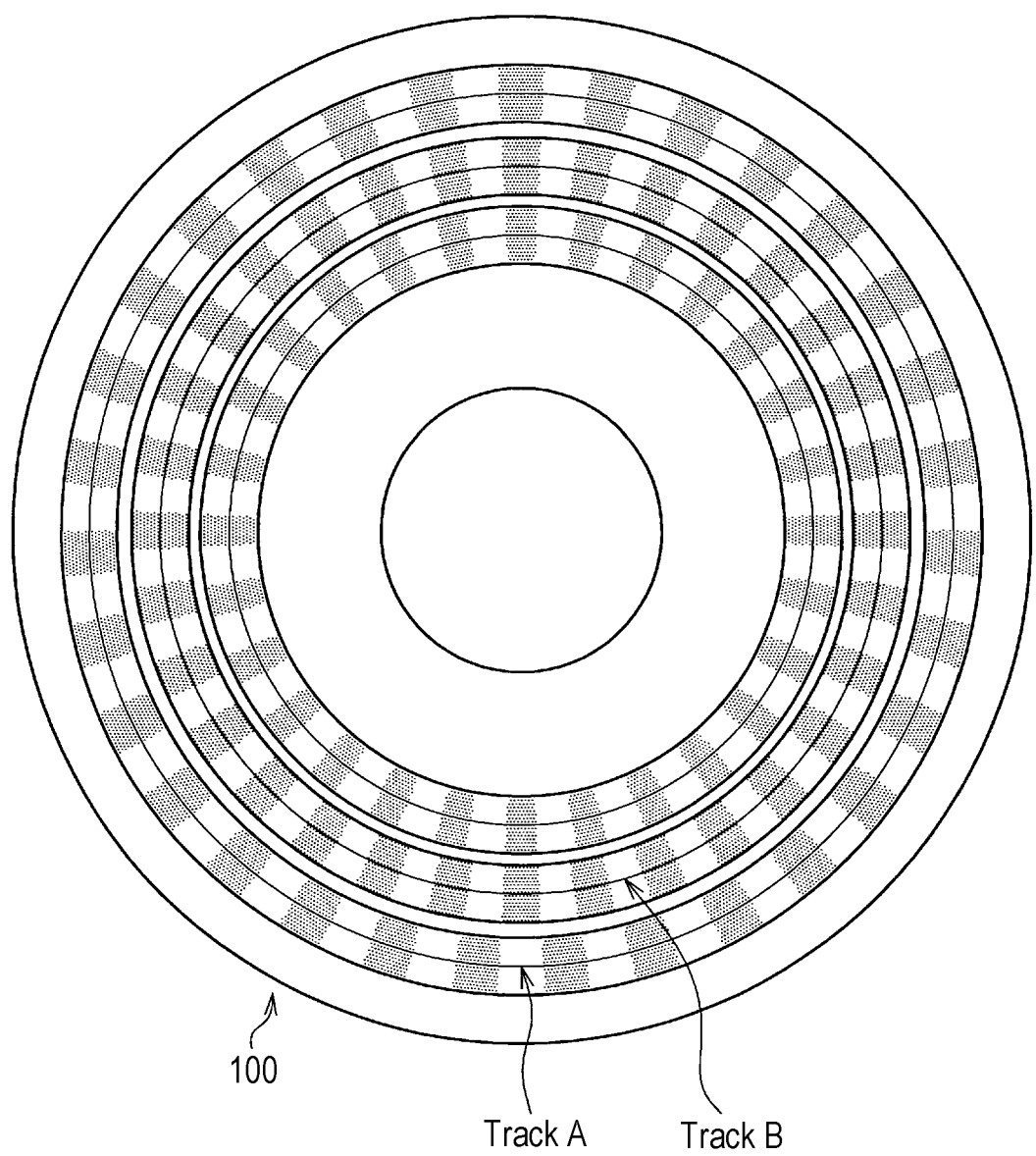
FIG. 3 is a schematic view illustrating a rotating body in more detail.

FIG. 3 is a schematic view illustrating the rotating body 100 in more detail. The rotating body 100 includes two tracks configured by forming a gear shape or a ruggedness or configured by alternately magnetizing N poles and S poles. Here, the two tracks are referred to as Track A and Track B, respectively. Teeth or ruggednesses having different cycles are formed or magnetization is performed, for example, in the respective tracks, and a cycle difference between Track A and Track B is 1. For example, in a case where Track A has 64 cycles, Track B has 63 cycles. As described above, each track has a scale of a predetermined cycle by a ruggedness, a magnetization pattern or the like.

Figure 4:
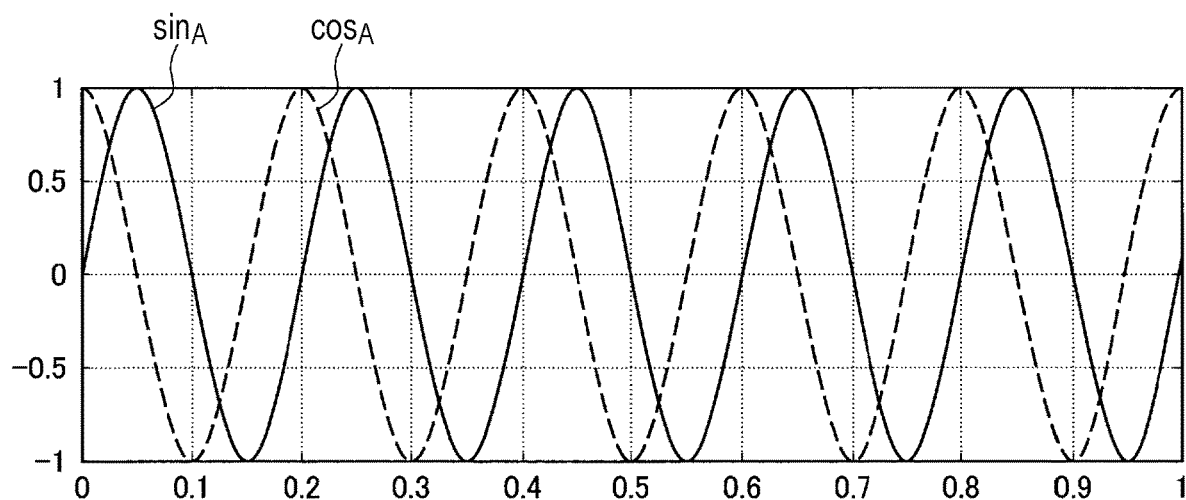
FIG. 4 is a characteristic diagram illustrating a sin voltage and a cos voltage of Track A and a sin voltage and a cos voltage of Track B.
Figure 4:
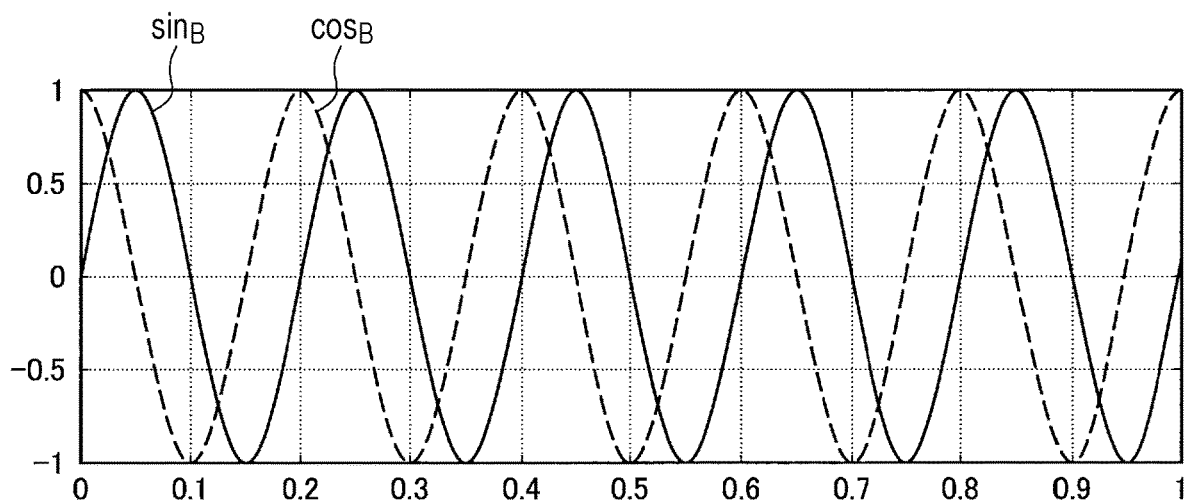

When calculating an absolute angle, arctangent 2 (atan(2) (hereinafter, referred to as atan 2 or arctan 2)) of sin voltages and cos voltages of each of Track A and Track B are calculated, and a difference between arctangent 2 (atan(2)) of the sin voltages and the cos voltages is calculated to obtain the absolute angle from a cycle difference (one cycle) between the tracks. FIG. 4 is a characteristic diagram illustrating a sin voltage $\sin_A$ and a cos voltage $\cos_A$ of Track A and a sin voltage $\sin_B$ and a cos voltage $\cos_B$ of Track B. An absolute angle $\theta_{ref}$ can be obtained from the following Equation 1.

$$\theta_{ref} = \operatorname{atan} 2(\cos_A, \sin_A) - \operatorname{atan} 2(\cos_B, \sin_B) \quad (1)$$

More specifically, since Track A has 64 cycles, cycles of fluctuations of $\sin_A$ and $\cos_A$ are 64 cycles, respectively. Since calculating arctangent 2 is equal to obtaining phases of $\sin_A$ and $\cos_A$ and $\sin_A$ and $\cos_A$ fluctuate in 64 cycles with respect to one period of the rotating body 100 (mechanical angle one period), the fluctuations of the phases (fluctuations of arctangent 2) also occur in 64 cycles. Therefore, a calculation result of arctangent 2 repeats an increase and decrease in 64 cycles. Since Track B has 63 cycles, a calculation result of arctangent 2 repeats an increase and decrease in 63 cycles. Therefore, $\operatorname{atan}(\cos_A \cdot \sin_A)$ repeats the increase and decrease in 64 cycles, while $\operatorname{atan}(\cos_B \cdot \sin_B)$ repeats the increase and decrease in 63 cycles, and a difference between $\operatorname{atan}(\cos_A \cdot \sin_A)$ and $\operatorname{atan}(\cos_B \cdot \sin_B)$ thus increases with an increase of a rotation angle when the rotating body 100 rotates once. Therefore, the absolute angle can be calculated from Equation 1.

Furthermore, a gear or rugged shape, or one cycle of magnetization is also referred to as a slit. The slits can be represented by fan-shaped regions obtained by dividing one rotation (which is 2π [rad] and corresponds to a moving range of the rotating body 100) of the rotating body 100. In addition to the method of obtaining the absolute angle by the method described above, there is a method of improving an accuracy by obtaining which slit the absolute angle is positioned in on the basis of the absolute angle obtained by Equation 1 and obtaining an interpolation angle in one slit to increase a substantial resolution. Note that the slit and the interpolation angle will be described in detail later.

Since the absolute angle obtained by the method of Equation 1 is affected by a signal distortion due to a processing error of the rotating body 100, assembly errors of the detection units 201 and 202, or the like, an angle accuracy decreases. Therefore, in the present embodiment, waveforms of the sin voltage and the cos voltage are corrected in a manner using two tracks to improve the angle accuracy.

Figure 5:
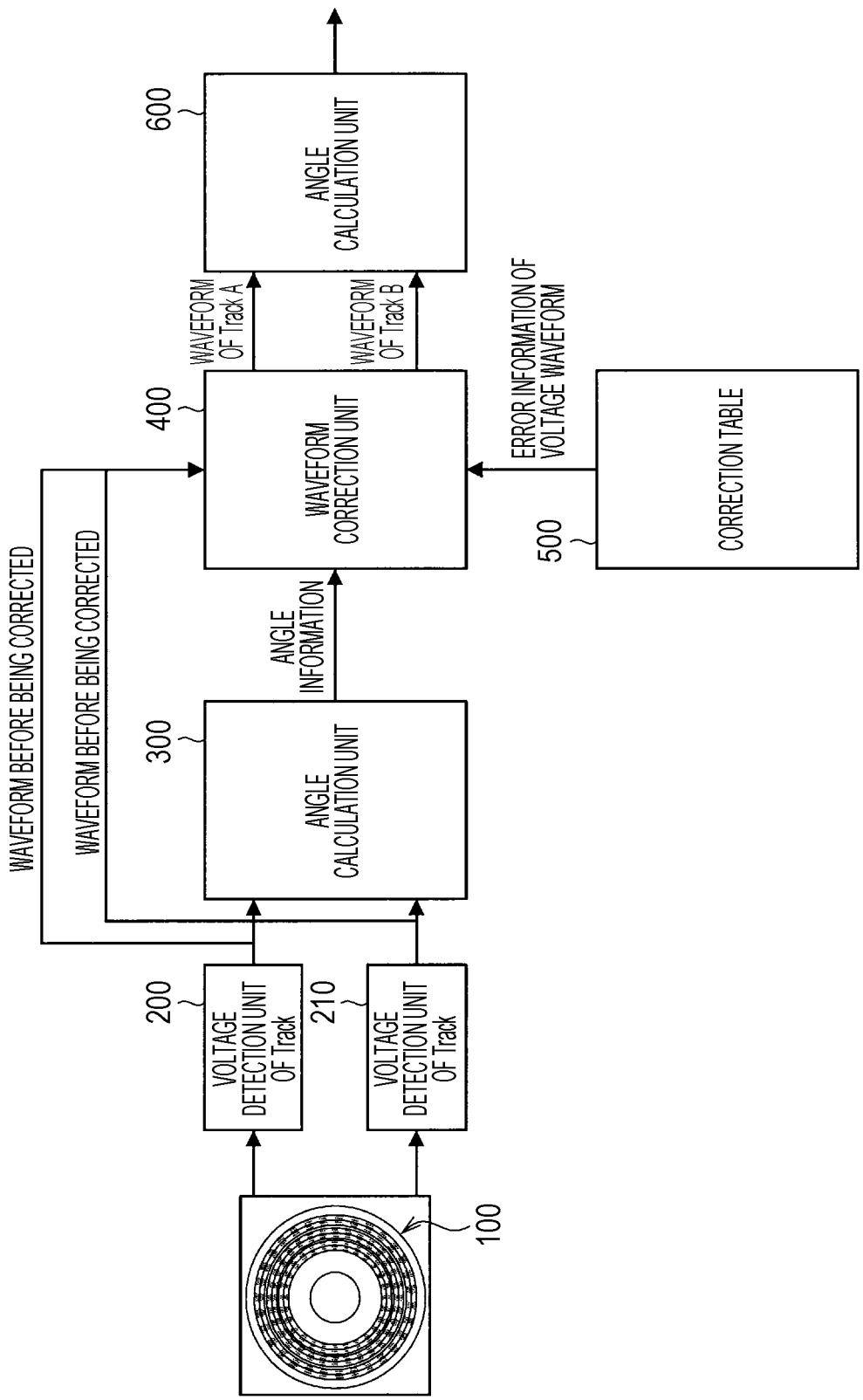
FIG. 5 is a block diagram illustrating a configuration of a position detection device according to the present embodiment.

2. Configuration Example of Position Detection Device According to Present Embodiment FIG. 5 is a block diagram illustrating a configuration of a position detection device according to the present embodiment. In the angle detection device illustrated in FIG. 5, the absolute angle of the rotating body 100 including two tracks, that is, Track A and Track B is detected. The angle detection device includes a detection unit 200 of Track A, a detection unit 210 of Track B, an angle calculation unit 300, a waveform correction unit 400, a correction table 500, and an angle calculation unit 600. Note that the angle calculation unit 600 corresponds to a position calculation unit and the angle calculation unit 300 corresponds to a second position calculation unit. Each of the detection unit 200 and the detection unit 210 includes the detection unit 201 and the detection unit 202 illustrated in FIG. 1.

As described above, the rotating body 100 includes tracks configured by a gear shape or a ruggedness, or magnetization. In a two-track manner, two tracks A and B are prepared, gear or rugged shapes having different cycles are formed in the respective tracks or magnetization or the like is performed in the respective tracks, and a cycle difference between Track A and Track B is 1. As described above, one cycle of teeth, irregularities, and magnetization is referred to as a slit. For example, in a case where Track A has 64 slits, Track B has 63 slits.

Rotation and movement of Track A are detected by the detection unit 200 of Track A. Furthermore, rotation and movement of Track B are detected by the detection unit 210 of Track B. Two sinusoidal waves (sin voltage and cos voltage) having a phase difference of 90° therebetween are obtained from the respective detection units 200 and 210. The angle calculation unit 300 calculates the absolute angle $\theta_{ref}$ on the basis of Equation 1. As described above, by calculating arctangent 2 (atan 2) of the signals of each of Track A and Track B and taking a difference between arctangent 2 (atan 2) of the signals, it is possible to obtain the absolute angle $\theta_{ref}$ using the cycle difference between Track A and Track B.

By the way, a distortion or a noise may occur in the voltage waveforms (sin voltages and cos voltages) having the phase difference of 90° therebetween obtained by the detection units 200 and 210 due to machining error, an assembly error or the like. Therefore, a difference between ideal voltage waveforms (ideal values) and the voltage waveforms (actual values) obtained by the detection units 200 and 210 can be taken in advance and can be stored in the correction table 500 to be used to correct the sin voltage and the cos voltage.

Figure 6:
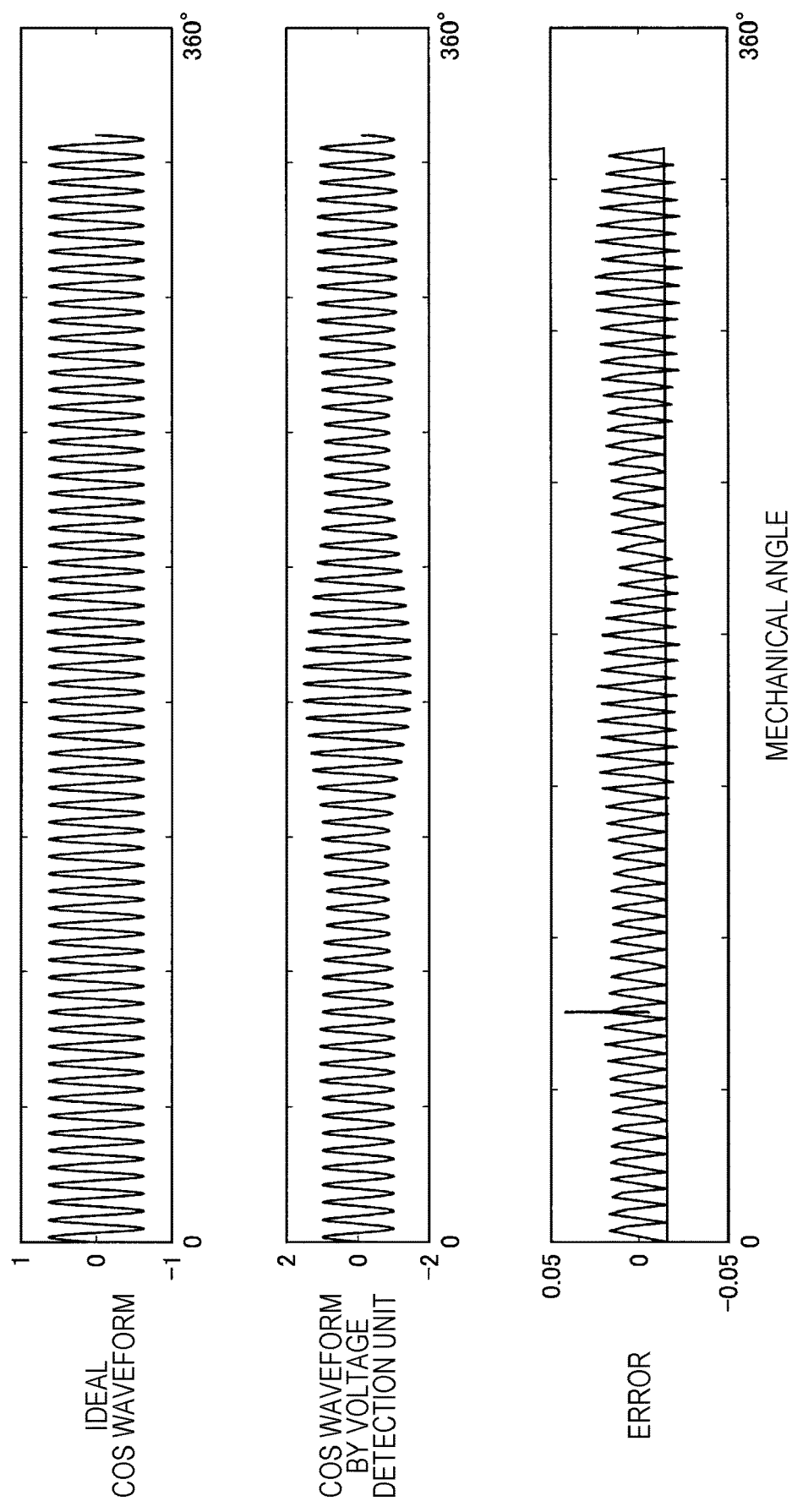
FIG. 6 is a characteristic diagram illustrating a waveform related to a cos voltage.

FIG. 6 is a characteristic diagram illustrating a waveform related to the cos voltage, and illustrates each of a waveform (ideal value) of an ideal cos voltage, a waveform (real value) of the cos voltage obtained by the detection unit 200, and a waveform (error) of a difference between the ideal cos voltage and the cos voltage obtained by the detection unit 200 sequentially from the top. As illustrated in FIG. 6, a distortion or a noise is included in the waveform of the cos voltage obtained by the detection unit 200. The distortion or the noise has an influence on an amplitude and cycles of the cos voltage.

Figures 7, 8, 9:
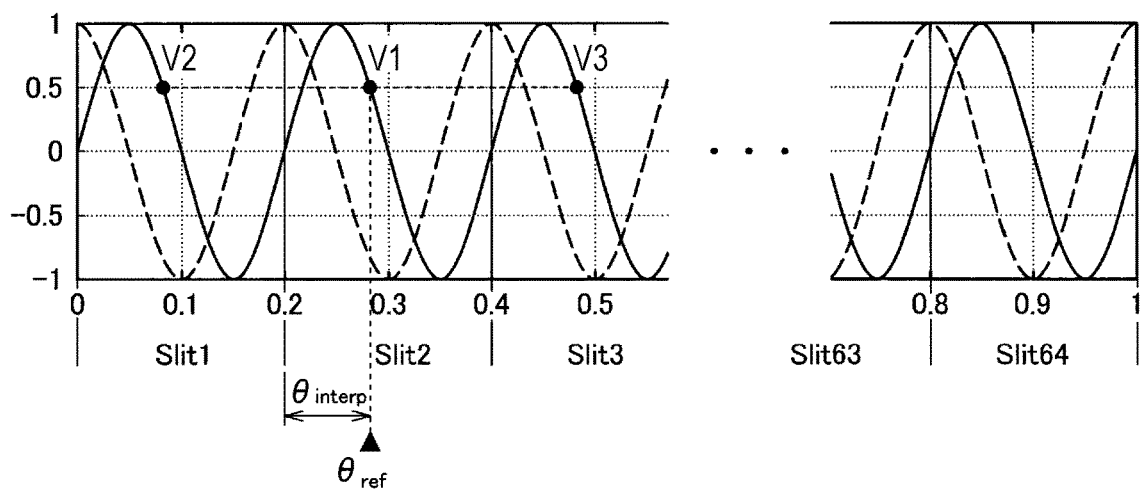
FIG. 7 is a schematic view illustrating a correction table 500 obtained from a waveform of a difference between an ideal cos voltage and a cos voltage obtained by a detection unit.
FIG. 8 is a schematic view illustrating processing of a waveform correction unit.
FIG. 9 is a schematic view illustrating a method of acquiring a correction value by an interpolation angle.

By performing calibration in advance, the waveform of the cos voltage obtained by the detection unit 200, which is illustrated in FIG. 6, is acquired, and the waveform (error) of the difference between the ideal cos voltage and the cos voltage obtained by the detection unit 200 is recorded in the correction table 500. FIG. 7 is a schematic view illustrating the correction table 500 obtained from the waveform of the difference between the ideal cos voltage and the cos voltage obtained by the detection unit 200. In an example illustrated in FIG. 7, the difference (error) between the ideal cos voltage and the cos voltage obtained by the detection unit 200 is recorded per 0.1° of a rotation angle (mechanical angle) of the rotating body 100. The correction table 500 is provided for each of the cos voltage and the sin voltage for each track.

The waveform correction unit 400 corrects the sin voltages and the cos voltages of each track on the basis of information of the correction table 500. FIG. 8 is a schematic view illustrating processing of the waveform correction unit 400. On the basis of the absolute angle $\theta_{ref}$ calculated by the angle calculation unit 300, the difference (error) of the voltage waveform at the rotation angle (mechanical angle) of the rotating body 100 corresponding to the absolute angle $\theta_{ref}$ is extracted from the correction table to correct the cos voltages and the sin voltages of each track. The angle calculation unit 600 calculates the absolute angle $\theta_{ref}$ according to Equation 1 using the cos voltages and the sin voltages of each track corrected by the waveform correction unit 400.

In this manner, the waveform correction unit 400 corrects the voltage waveforms (cos voltages and sin voltages) obtained by the detection units 200 and 210 on the basis of data of the correction table 500. At this time, the waveform correction unit 400 acquires a correction value (difference) corresponding to the absolute angle $\theta_{ref}$ obtained by the angle calculation unit 300 with reference to the absolute angle $\theta_{ref}$ from the correction table 500. Therefore, the absolute angle $\theta_{ref}$ is calculated using the cos voltages and the sin voltages of each track in which the distortion or the noise is corrected, and the absolute angle $\theta_{ref}$ can thus be obtained with a high accuracy.

Examples of a method of extracting the correction value from the correction table 500 can include a method of adopting a correction value of an angle closest to the absolute angle $\theta_{ref}$ obtained by the angle calculation unit 300, and the like. Furthermore, it is also possible to adopt a value obtained by interpolating a plurality of correction values of angles close to the absolute angle $\theta_{ref}$ obtained by the angle calculation unit 300. Furthermore, a method of obtaining a more accurate correction value by performing interpolation from correction values of the previous and subsequent angles can be considered.

3. Method of Acquiring Correction Value by Interpolation Angle

FIGS. 9 and 10 are schematic views illustrating a method of acquiring a correction value by an interpolation angle. As described above, one cycle of the voltage waveform is referred to as the slit. FIG. 9 illustrates a case of 64 slits, and in this example, when the rotating body 100 rotates once, a waveform of 64 cycles is generated. As illustrated in FIG. 9, a number is attached to each slit. Furthermore, a horizontal axis in FIG. 9 indicates 360° as "1".

The angle calculation unit 300 calculates a slit number corresponding to the absolute angle $\theta_{ref}$. Furthermore, the angle calculation unit 300 calculates an angle in the slit (referred to as an interpolation angle $\theta_{interp}$) corresponding to the absolute angle $\theta_{ref}$. The interpolation angle $\theta_{interp}$ is calculated from the following Equation 2.

$$\theta_{interp} = \text{atan } 2(\cos_A, \sin_A) \quad (2)$$

In FIG. 9, when the slit number corresponding to the absolute angle $\theta_{ref}$ is "2" and the interpolation angle $\theta_{interp}$ is obtained from Equation 2, the absolute angle can be more accurately represented by the slit number (=2) and the interpolation angle $\theta_{interp}$. Furthermore, the waveform correction unit 400 obtains a correction value V1 of the sin voltage corresponding to the absolute angle $\theta_{ref}$ with reference to the correction table 500. Furthermore, correction values V2 and V3 of slits having the same interpolation angle $\theta_{interp}$ and positioned before and after Slit2 can also be obtained, such that a final correction value is obtained by averaging three correction values. In other words, the final correction value can be represented by the following Equation 3.

$$\text{Correction Value} = (V1 + V2 + V3)/3$$

As described above, by calculating an average value of error information of adjacent slits having the same interpolation angle, even in a case where an error is included in the absolute angle $\theta_{ref}$ calculated by the angle calculation unit 300, an influence of the error can be decreased. In a case of using one correction value corresponding to the absolute angle $\theta_{ref}$ when an error is included in the correction value, a position detection accuracy may decrease, but by calculating the average value of the error information of the adjacent slits having the same interpolation angle, it is possible to further improve the accuracy as compared with the case of using one correction value.

Specifically, errors of the sin voltage and the cos voltage have a sinusoidal shape as illustrated in FIG. 6, and cycles of the sin voltage and the cos voltage are substantially the same as the interpolation angle. Therefore, in a case where only errors at places at which the interpolation angles in each slit are the same as each other are extracted and graphed, a change in the errors becomes gentle with respect to a mechanical angle one period. The angle calculated by the angle calculation unit 300 does not have a sufficient angle accuracy, such that even though the table is referred to using information of an interpolation angle with a good accuracy, there is a possibility that error information of the same interpolation angle of the adjacent slits can be referred to, and when the voltages are erroneously corrected on the basis of the error information of the adjacent slits, there is a possibility that the sin voltage and the cos voltage will become discontinuous only by the corrected voltages.

Therefore, by calculating the average of the error information, even though the error information of the adjacent slits is erroneously used, the error information is averaged by the error information of the previous and subsequent slits, and it is thus possible to suppress a phenomenon in which the sin voltage and the cos voltage after being corrected become discontinuous. However, when the error information is averaged, even in a case where a correct slit is obtained from an angle calculation result of the angle calculation unit 300, there is a possibility that the error information will deviate from correct error information due to an influence of the error information of the previous and subsequent slits. As described above, if the interpolation angles are the same as each other, a distribution of the errors changes gently, and it is thus possible to suppress the error in a case where the average value is calculated.

4. Configuration Example of Repeating Waveform Correction and Angle Calculation

Figure 11:
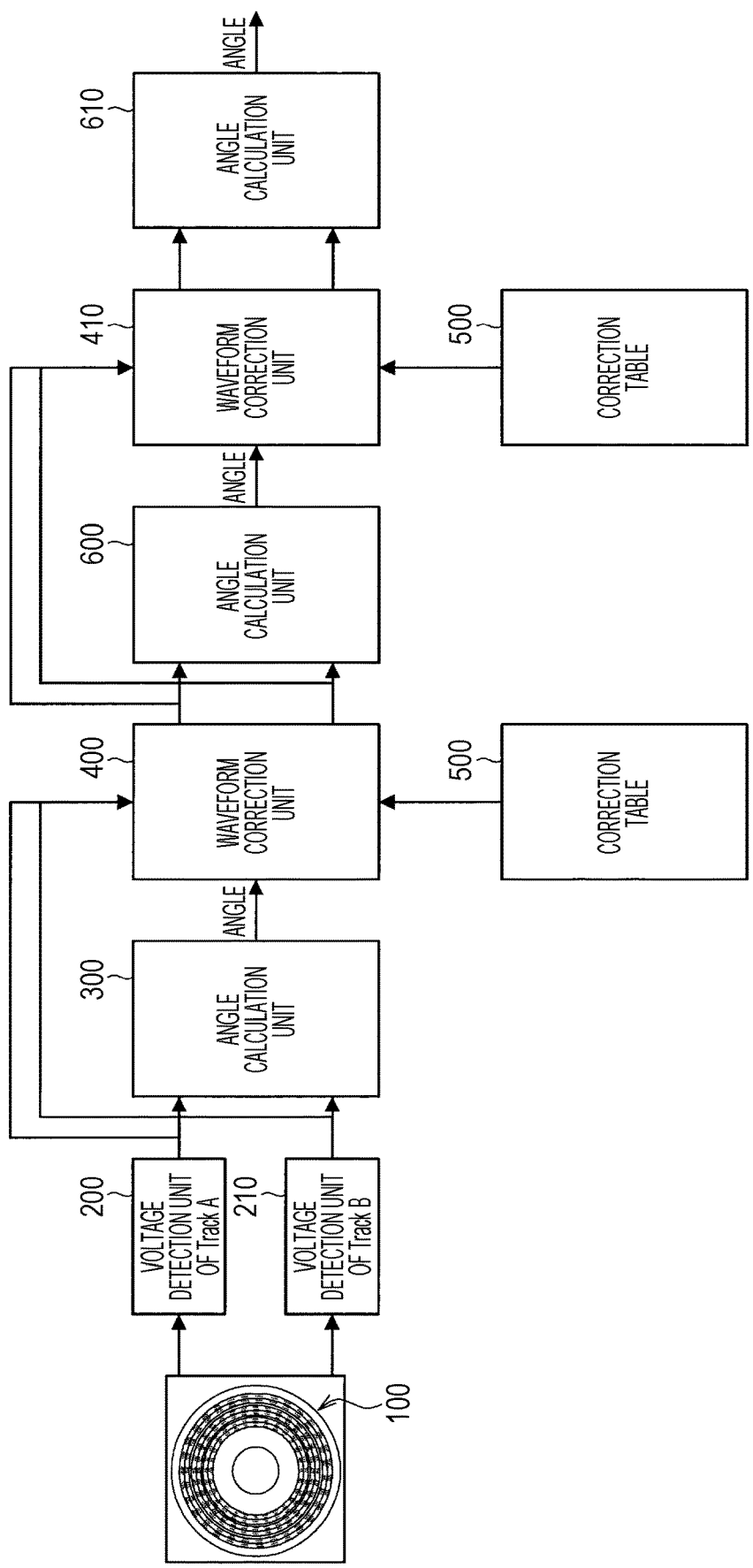
FIG. 11 is a schematic view illustrating a configuration example of repeating waveform correction and angle calculation.

FIG. 11 is a schematic view illustrating a configuration example of repeating waveform correction and angle calculation. In the configuration illustrated in FIG. 11, a waveform correction unit. (second waveform correction unit) 410, a correction table 500, and an angle calculation unit 610 are provided behind the angle calculation unit 600 of FIG. 5. A configuration of the waveform correction unit 410 is similar to that of the waveform correction unit 400, and a configuration of the angle calculation unit 610 is similar to that of the angle calculation unit 600. Furthermore, correction tables used by the waveform correction unit 400 and the waveform correction unit 410 are the same as each other. The angle calculation unit 600 obtains an absolute angle on the basis of the voltage waveform corrected by the waveform correction unit 400, and the waveform correction unit 410 further uses the obtained absolute angle to perform correction in a manner similar to that of the waveform correction unit 400. The angle calculation unit 610 calculates an absolute angle on the basis of a voltage waveform corrected by the waveform correction unit 410. By further correcting the voltage waveform corrected by the waveform correction unit 400 by the waveform correction unit 410, it is possible to further increase an accuracy. Note that waveform correction processing is repeated twice in FIG. 11, but the waveform correction processing may be repeated three or more times.

5. Configuration Example of Correcting Interpolation Angle

Figure 12:
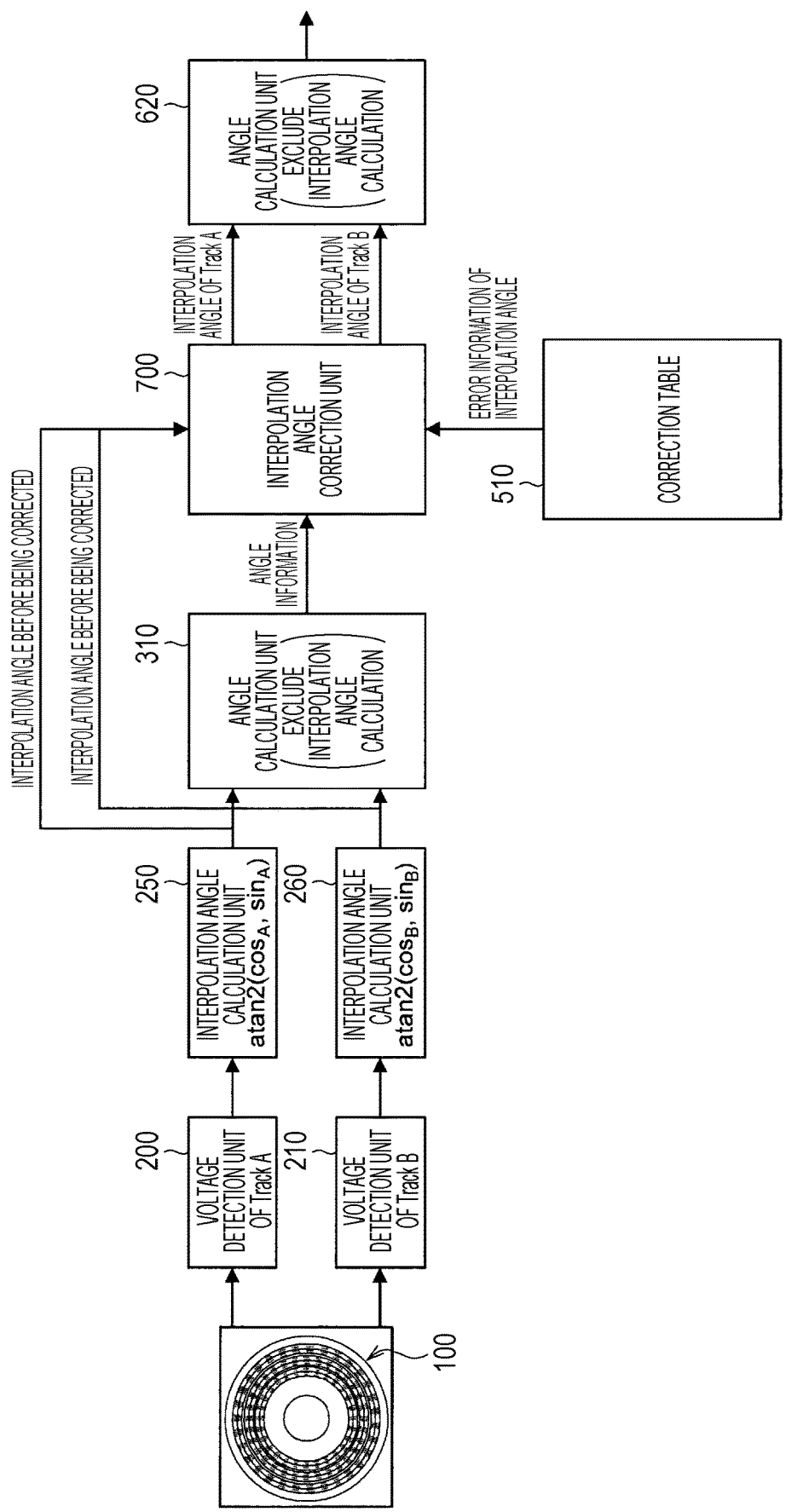
FIG. 12 is a schematic view illustrating a configuration example of performing interpolation angle correction instead of the waveform correction.
Figure 13:
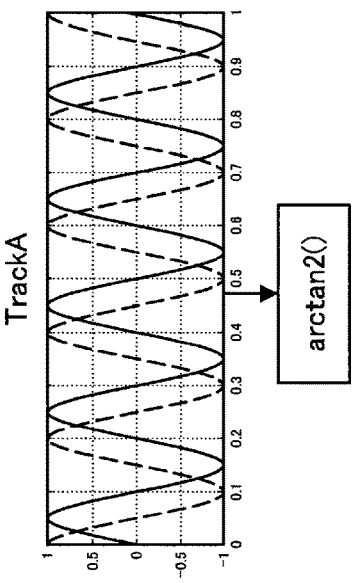
FIG. 13 is a schematic view for describing an interpolation angle.
Figure 13:
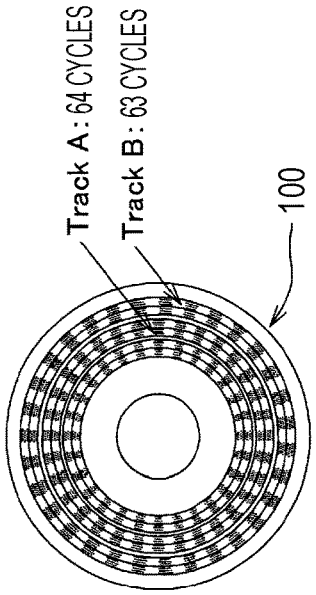
Figure 13:
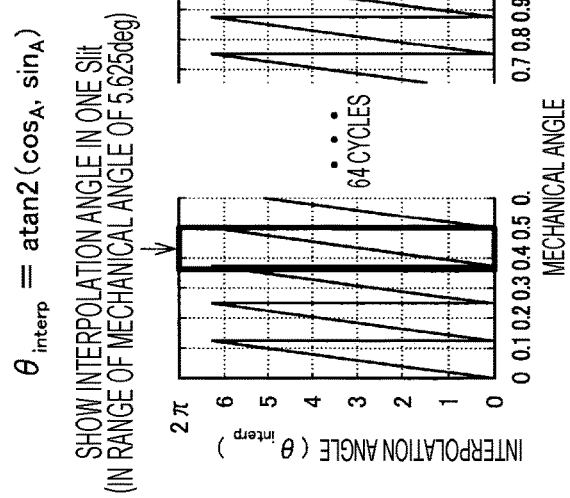
Figure 13:
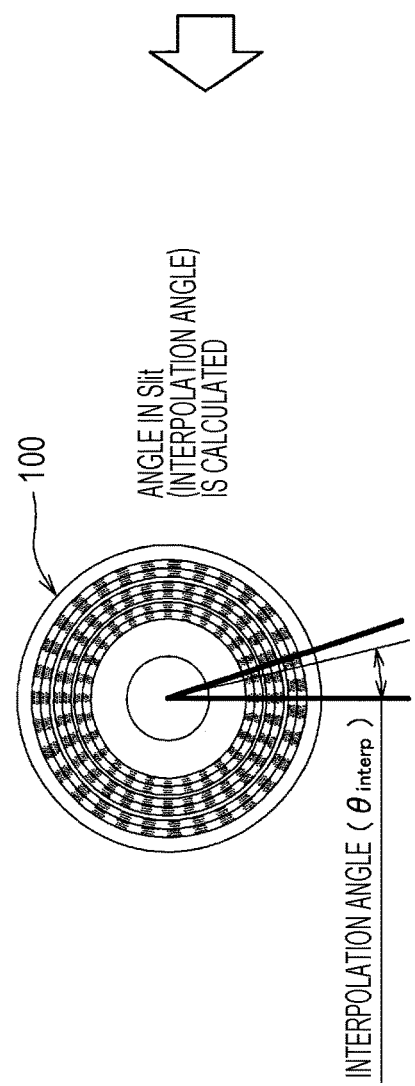

FIG. 12 is a schematic view illustrating a configuration example of performing interpolation angle correction instead of the waveform correction. In the configuration example illustrated in FIG. 12, interpolation angle calculation units 250 and 260 for calculating interpolation angles are provided. The interpolation angles are obtained by the interpolation angle calculation units 250 and 260 on the basis of the voltage waveforms obtained from the voltage detection units 200 and 210. FIG. 13 is a schematic view for describing the interpolation angle. As described above, the interpolation angle can be represented as an angle within one slit. For example, in a case where two sinusoidal waves having a phase deviation of 90° therebetween are obtained by the detection unit 200 or the detection unit 210, the interpolation angle $\theta_{interp}$ can be calculated by arctangent 2 by the above Equation 2.

In FIG. 13, an example in which the interpolation angle $\theta_{interp}$ is obtained from the cos voltage ($\cos_A$) and the sin voltage ($\sin_A$) of Track A by Equation 2 is illustrated. In FIG. 13, a case of 64 cycles is illustrated, and an angle of one slit is 360°/64=5.625°. The interpolation angle $\theta_{interp}$ obtained by arctangent 2 represents an angle position within one slit. Since a position of the slit is determined by a slit number corresponding to the absolute angle $\theta_{ref}$, the absolute angle can be represented by the slit number and the interpolation angle $\theta_{interp}$. The interpolation angle $\theta_{interp}$ indicates a phase of the sin voltage and the cos voltage obtained by the voltage detection units 200 and 210. In a case where the number of slits is 64, when the rotating body 100 rotates by one slit, the phase of the sin voltage and the cos voltage rotates in one cycle, when a disk rotates by a mechanical angle one period, the phase of the sin voltage and the cos voltage rotate in 64 cycles.

Also in a waveform of the interpolation angle $\theta_{interp}$ illustrated in FIG. 13, the interpolation angle $\theta_{interp}$ is obtained from the cos voltage and the sin voltage, and thus, there is a possibility that an accuracy will be deteriorated due to an influence of a noise. Therefore, in the configuration example illustrated in FIG. 12, the interpolation angles before being corrected, which are calculated by the interpolation angle calculation unit 250 and the interpolation angle calculation unit 260, are sent to an interpolation angle correction unit 700. A distortion and an error due to a machining accuracy or an assembly error may be included in the interpolation angle $\theta_{interp}$. Therefore, similar to the correction table 500 of the cos voltage and the sin voltage, with respect to the interpolation angle $\theta_{interp}$, an ideal interpolation angle (ideal value) and a real value (actual value) are compared with each other and a difference between the ideal interpolation angle and the real value is recorded in advance in a correction table 510.

An angle calculation unit 310 illustrated in FIG. 5 also performs calculation of the interpolation angle, but an angle calculation unit (first position calculation unit) 310 illustrated in FIG. 13 performs angle calculation other than the interpolation angle. Specifically, the angle calculation unit 310 obtains the absolute angle $\theta_{ref}$ from Equation 1 on the basis of the interpolation angles before being corrected, which are calculated by the interpolation angle calculation unit 250 and the interpolation angle calculation unit 260.

The interpolation angle correction unit 700 corrects the interpolation angles before being corrected, which are calculated by the interpolation angle calculation unit 250 and the interpolation angle calculation unit 260, on the basis of error information of the interpolation angles obtained from the correction table 510. At this time, the interpolation angle correction unit 700 obtains a slit number corresponding to the absolute angle $\theta_{ref}$ sent from the angle calculation unit 310, and corrects an interpolation angle corresponding to the slit number using the difference recorded in the correction table 510. The corrected interpolation angle is sent to an angle calculation unit 620. The angle calculation unit (second position calculation unit) 620 calculates an absolute angle on the basis of the corrected interpolation angle. More specifically, the angle calculation unit 620 calculates the absolute angle on the basis of the corrected interpolation angle and the slit number corresponding to the absolute angle $\theta_{ref}$ sent from the angle calculation unit 310.

Also in a case of correcting the interpolation angle, it is possible to further increase a calculation accuracy of an angle by repeatedly performing calculation from a viewpoint similar to that of FIG. 11.

6. Configuration Example in Case of Three Tracks

Figure 14:
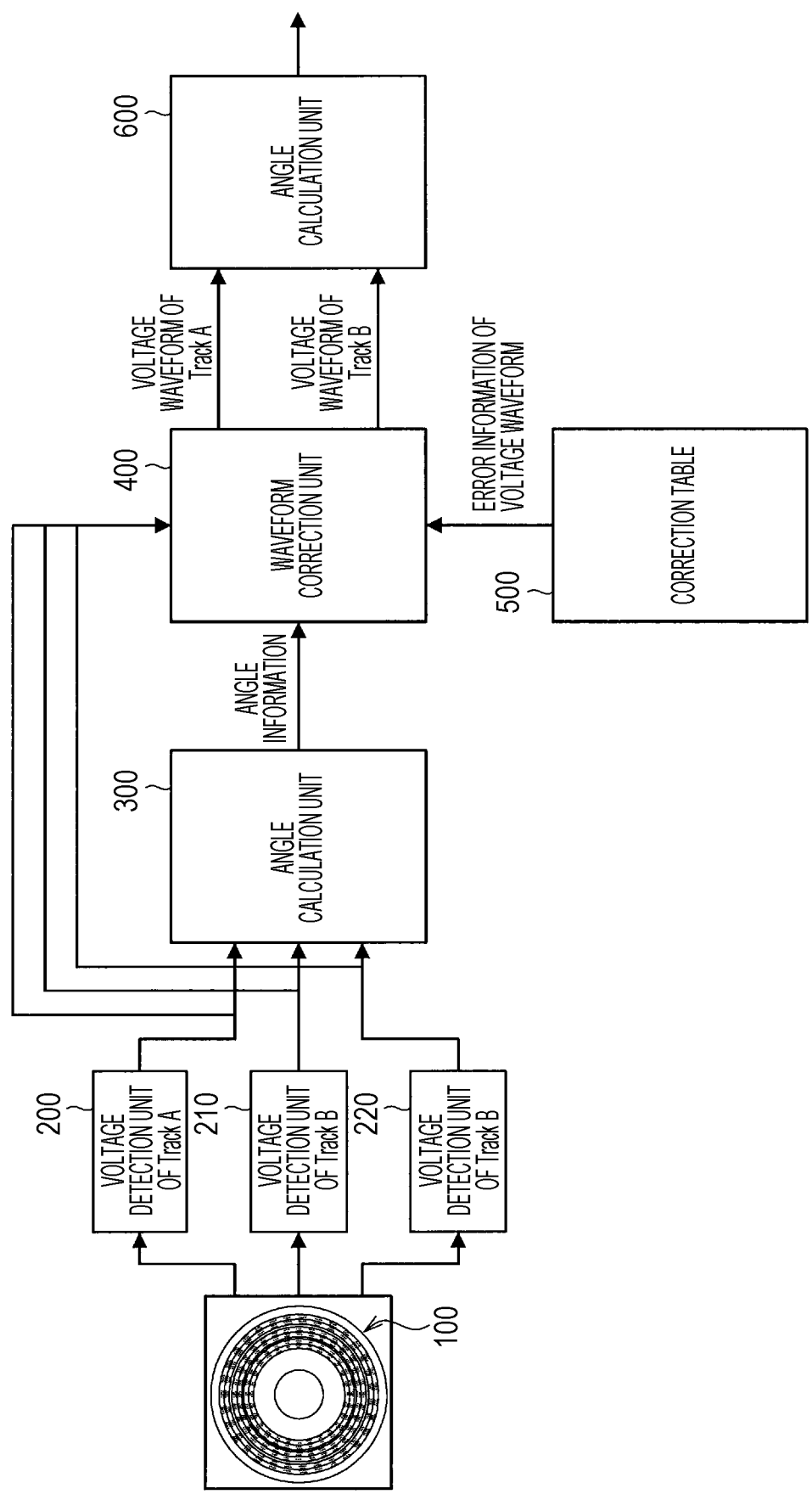
FIG. 14 is a schematic view illustrating a configuration in a case where the number of tracks is three.

A case where the number of tracks is two has been described hereinabove, but the number of tracks can further increase. FIG. 14 is a schematic view illustrating a configuration in a case where the number of tracks is three. In FIG. 14, Track C is provided in addition to Track A and Track B. As an example, Track A can have 64 cycles, Track B can have 63 cycles, and Track C can have 56 cycles. As described above, even in a case where the number of tracks is three or more, it is possible to correct voltage waveforms of each track by performing processing similar to that of FIG. 5.

As described above, according to the present embodiment, even in a case where an individual difference of an encoder is large or even in a case where individuals of the encoder have an anomalous error distribution, an angle deviation can be corrected by a simple mechanism such as table reference, and a position detection accuracy can thus be increased. Furthermore, even in the case where the individual difference of the encoder is large or even in the case where the individuals of the encoder have the anomalous error distribution, by setting contents of the table according to the individuals, there is no need to change a correction logic and it is possible to perform correction with a good accuracy.

Furthermore, by performing table correction on the voltage waveform, it is possible to suppress a high frequency noise (synchronization component of an encoder slit cycle). Furthermore, by performing a table reference method with reference to the interpolation angle, it is possible to suppress an error at the time of table reference and it is possible to improve an accuracy of the table correction.

Furthermore, by repeatedly performing the table correction and the angle calculation, it is possible to gradually improve an angle accuracy. Furthermore, it is also possible to adjust the number of times of calculation according to a required accuracy.

The present embodiment can be applied regardless of a shape and a manner of the encoder. Furthermore, the present embodiment can also be applied to any type of voltage signal detected by a sensor as long as an ideal signal is recognized.

Hereinabove, the preferred embodiments of the present disclosure have been described in detail with reference to the accompanying drawings, but the technical scope of the present disclosure is not limited to such embodiments. It will be apparent to those skilled in the art of the present disclosure that various modifications or alterations can be conceived within the scope of the technical idea described in the claims, and it is naturally understood that these modifications or alterations also fall within the technical scope of the present disclosure.

Furthermore, the effects described in the present specification are only illustrative or exemplary rather than being restrictive. That is, the technology according to the present disclosure can accomplish other effects apparent to those skilled in the art from the description of the present specification, in addition to or instead of the effects described above.

Note that the following configurations also fall within the technical scope of the present disclosure.

(1)

A position detection device including:

a waveform correction unit that corrects waveforms of a first signal and a second signal, the first signal being detected from a first track provided on a moving body and having a scale of predetermined cycles, and the second signal being detected from a second track provided on the moving body and having a scale of cycles less than the predetermined cycles; and a position calculation unit that calculates a position of the moving body on the basis of the corrected first signal and second signal.

(2)

The position detection device according to the above (1), in which the first signal includes two sinusoidal waves having a phase difference of 90° therebetween, and the second signal includes two sinusoidal waves having a phase difference of 90° therebetween.

(3)

The position detection device according to the above (2), in which the position calculation unit calculates the position of the moving body from a difference between a first value and a second value, the first value being obtained by calculating arctangent 2 of the two sinusoidal waves of the first signal, and the second value being obtained by calculating arctangent 2 of the two sinusoidal waves of the second signal.

(4)

The position detection device according to any one of the above (1) to 3, in which the waveform correction unit corrects the waveform of the first signal with a first correction value and corrects the waveform of the second signal with a second correction value on the basis of a table in which the first correction value and the second correction value are recorded in advance, the first correction value being a difference between an actual value and an ideal value of the first signal, and the second correction value being a difference between an actual value and an ideal value of the second signal.

(5)

The position detection device according to the above (4), further including a second position calculation unit that calculates a position of the moving body on the basis of the first signal and second signal before being corrected, in which the table records the first correction value and the second correction value in association with the position of the moving body in advance, and the waveform correction unit corrects the waveform of the first signal and the waveform of the second signal on the basis of the first correction value and the second correction value obtained by applying the position of the moving body calculated by the second position calculation unit to the table.

(6)

The position detection device according to the above (5), in which the waveform correction unit corrects the waveform of the first signal and the waveform of the second signal on the basis of a plurality of the first correction values and the second correction values obtained by applying a first position of the moving body calculated by the second position calculation unit and a plurality of second positions adjacent to the second position to the table.

(7)

The position detection device according to the above (6), in which the waveform correction unit corrects the waveform of the first signal and the waveform of the second signal on the basis of an average value of a plurality of the first correction values and an average value of a plurality of the second correction values.

(8)

The position detection device according to the above (6), in which the first position and the second position are spaced apart from each other by adjacent slits among a plurality of slits obtained by dividing a moving range of the moving body.

(9)

The position detection device according to the above (5), further including a second waveform correction unit that further corrects the waveform of the first signal and the waveform of the second signal corrected by the waveform correction unit, on the basis of the first correction value and the second correction value obtained by applying the position of the moving body calculated by the position calculation unit to the table.

(10)

The position detection device according to any one of the above (1) to (9), further including:

a first signal detection unit that detects the first signal; and a second signal detection unit that detects the second signal.

(11)

A position detection device including:

a first interpolation angle calculation unit that calculates a first interpolation angle from a first signal detected from a first track provided on a moving body and having a scale of predetermined cycles;

a second interpolation angle calculation unit that calculates a second interpolation angle from a second signal detected from a second track provided on the moving body and having a scale of cycles less than the predetermined cycles;

a first position calculation unit that calculates a position of the moving body on the basis of the first interpolation angle and the second interpolation angle;

an interpolation angle correction unit that corrects the first interpolation angle and the second interpolation angle on the basis of the position of the moving body; and a second position calculation unit that calculates a position of the moving body on the basis of the corrected first interpolation angle and second interpolation angle.

(12)

The position detection device according to the above (11), in which the first signal includes two sinusoidal waves having a phase difference of 90° therebetween, and the second signal includes two sinusoidal waves having a phase difference of 90° therebetween.

(13)

The position detection device according to the above (12), in which the first interpolation angle calculation unite, calculates the first interpolation angle by calculating arctangent 2 of the two sinusoidal waves of the first signal, and the second interpolation angle calculation unit calculates the second interpolation angle by calculating arctangent 2 of the two sinusoidal waves of the second signal.

(14)

The position detection device according to the above (11), in which the interpolation angle correction unit corrects the first interpolation angle with a first correction value and corrects the second interpolation angle with a second correction value on the basis of a table in which the first correction value and the second correction value are recorded in advance, the first correction value being a difference between an actual value and an ideal value of the first interpolation angle, and the second correction value being a difference between an actual value and an ideal value of the second interpolation angle.

(15)

The position detection device according to claim 11, further including:

a first signal detection unit that detects the first signal; and a second signal detection unit that detects the second signal.

(16)

The position detection device according to any one of the above (1) to (15), is which the moving body rotates around a rotation center.

(17)
The position detection device according to any one of the above (1) to (15), in which the moving body linearly moves.

(18)
The position detection device according to any one of the above (1) to (17), in which the scale is configured by a gear shape or a rugged shape provided on the moving body or is configured by alternately magnetizing N poles and S poles.

(19)
The position detection device according the above (10) or (15), in which the first detection unit detects the first signal corresponding to a change in light or a change in a magnetic field due to movement of the scale of the first track, and
the second detection unit detects the second signal corresponding to a change in light or a change in a magnetic field due to movement of the scale of the second track.

(20)
The position detection device according to any one of the above (1) to (19), in which the second track has a scale having cycles smaller by one cycle than the predetermined cycles.

(21)
A position detection method including:
correcting waveforms of a first signal and a second signal, the first signal being detected from a first track provided on a moving body and having a scale of predetermined cycles, and the second signal being detected from a second track provided on the moving body and having a scale of cycles less than the predetermined cycles; and
calculating a position of the moving body on the basis of the corrected first signal and second signal.

(22)
A position detection method including:
calculating a first interpolation angle from a first signal detected from a first track provided on a moving body and having a scale of predetermined cycles;
calculating a second interpolation angle from a second signal detected from a second track provided on the moving body and having a scale of cycles less than the predetermined cycles;
calculating a position of the moving body on the basis of the first interpolation angle and the second interpolation angle;
correcting the first interpolation angle and the second interpolation angle on the basis of the position of the moving body; and
calculating a position of the moving body on the basis of the corrected first interpolation angle and second interpolation angle.

REFERENCE SIGNS LIST

100 Rotating body
200, 210 Detection unit
250, 260 Interpolation angle calculation unit
300, 310, 600, 610, 620 Angle calculation unit
400 Waveform correction unit
500, 510 Correction table
700 Interpolation angle Correction unit

The invention claimed is:

1. A position detection device comprising:
a waveform correction unit that corrects waveforms of a first signal and a second signal, the first signal being detected from a first track provided on a moving body and having a scale of predetermined cycles, and the second signal being detected from a second track provided on the moving body and having a scale of cycles less than the predetermined cycles;
a first position calculation unit that calculates a position of the moving body on a basis of the corrected first signal and second signal; and
a second position calculation unit that calculates a position of the moving body on a basis of the first signal and second signal before being corrected,
wherein the waveform correction unit corrects the waveform of the first signal with a first correction value and corrects the waveform of the second signal with a second correction value on a basis of a table in which the first correction value and the second correction value are recorded in advance, the first correction value being a difference between an actual value and an ideal value of the first signal, and the second correction value being a difference between an actual value and an ideal value of the second signal,
wherein the table records the first correction value and the second correction value in association with the position of the moving body in advance, and
wherein the waveform correction unit corrects the waveform of the first signal and the waveform of the second signal on a basis of the first correction value and the second correction value obtained by applying the position of the moving body calculated by the second position calculation unit to the table.

2. The position detection device according to claim 1, wherein the first signal includes two sinusoidal waves having a phase difference of 90° therebetween, and the second signal includes two sinusoidal waves having a phase difference of 90° therebetween.

3. The position detection device according to claim 2, wherein the first position calculation unit calculates the position of the moving body from a difference between a first value and a second value, the first value being obtained by calculating arctangent 2 of the two sinusoidal waves of the first signal, and the second value being obtained by calculating arctangent 2 of the two sinusoidal waves of the second signal.

4. The position detection device according to claim 1, wherein the waveform correction unit corrects the waveform of the first signal and the waveform of the second signal on a basis of a plurality of the first correction values and the second correction values obtained by applying a first position of the moving body calculated by the second position calculation unit and a plurality of second positions adjacent to the second position to the table.

5. The position detection device according to claim 4, wherein the waveform correction unit corrects the waveform of the first signal and the waveform of the second signal on a basis of an average value of a plurality of the first correction values and an average value of a plurality of the second correction values.

6. The position detection device according to claim 4, wherein the first position and the second position are spaced apart from each other by adjacent slits among a plurality of slits obtained by dividing a moving range of the moving body.

7. The position detection device according to claim 1, further comprising a second waveform correction unit that further corrects the waveform of the first signal and the waveform of the second signal corrected by the waveform correction unit, on a basis of the first correction value and the second correction value obtained by applying the position of the moving body calculated by the first position calculation unit to the table.

8. The position detection device according to claim 1, further comprising:
a first signal detection unit that detects the first signal; and
a second signal detection unit that detects the second signal.

9. A position detection device comprising:
a first interpolation angle calculation unit that calculates a first interpolation angle from a first signal detected from a first track provided on a moving body and having a scale of predetermined cycles;
a second interpolation angle calculation unit that calculates a second interpolation angle from a second signal detected from a second track provided on the moving body and having a scale of cycles less than the predetermined cycles;
a first position calculation unit that calculates a position of the moving body on a basis of the first interpolation angle and the second interpolation angle;
an interpolation angle correction unit that corrects the first interpolation angle and the second interpolation angle on a basis of the position of the moving body; and
a second position calculation unit that calculates a position of the moving body on a basis of the corrected first interpolation angle and second interpolation angle.

10. The position detection device according to claim 9, wherein the first signal includes two sinusoidal waves having a phase difference of 90° therebetween, and the second signal includes two sinusoidal waves having a phase difference of 90° therebetween.

11. The position detection device according to claim 10, wherein the first interpolation angle calculation unit calculates the first interpolation angle by calculating arctangent 2 of the two sinusoidal waves of the first signal, and
the second interpolation angle calculation unit calculates the second interpolation angle by calculating arctangent 2 of the two sinusoidal waves of the second signal.

12. The position detection device according to claim 9, wherein the interpolation angle correction unit corrects the first interpolation angle with a first correction value and corrects the second interpolation angle with a second correction value on a basis of a table in which the first correction value and the second correction value are recorded in advance, the first correction value being a difference between an actual value and an ideal value of the first interpolation angle, and the second correction value being a difference between an actual value and an ideal value of the second interpolation angle.

13. The position detection device according to claim 9, further comprising:
a first signal detection unit that detects the first signal; and
a second signal detection unit that detects the second signal.

14. The position detection device according to claim 1, wherein the moving body rotates around a rotation center.

15. The position detection device according to claim 1, wherein the moving body linearly moves.

16. The position detection device according to claim 1, wherein the scale is configured by a gear shape or a rugged shape provided on the moving body or is configured by alternately magnetizing N poles and S poles.

17. The position detection device according to claim 8, wherein the first signal detection unit detects the first signal corresponding to a change in light or a change in a magnetic field due to movement of the scale of the first track, and
the second signal detection unit detects the second signal corresponding to a change in light or a change in a magnetic field due to movement of the scale of the second track.

18. The position detection device according to claim 1, wherein the second track has a scale having cycles smaller by one cycle than the predetermined cycles.

19. A position detection method comprising:
correcting waveforms of a first signal and a second signal, the first signal being detected from a first track provided on a moving body and having a scale of predetermined cycles, and the second signal being detected from a second track provided on the moving body and having a scale of cycles less than the predetermined cycles;
calculating a position of the moving body on a basis of the corrected first signal and second signal; and
calculating a position of the moving body on a basis of the first signal and second signal before being corrected,
wherein the waveform of the first signal is corrected with a first correction value and the waveform of the second signal is corrected with a second correction value on a basis of a table in which the first correction value and the second correction value are recorded in advance, the first correction value being a difference between an actual value and an ideal value of the first signal, and the second correction value being a difference between an actual value and an ideal value of the second signal,
wherein the table records the first correction value and the second correction value in association with the position of the moving body in advance, and
wherein the waveform of the first signal and the waveform of the second signal are corrected on a basis of the first correction value and the second correction value obtained by applying, to the table, the position of the moving body calculated on the basis of the first signal and the second signal before being corrected.

20. A position detection method comprising:
calculating a first interpolation angle from a first signal detected from a first track provided on a moving body and having a scale of predetermined cycles;
calculating a second interpolation angle from a second signal detected from a second track provided on the moving body and having a scale of cycles less than the predetermined cycles;
calculating a position of the moving body on a basis of the first interpolation angle and the second interpolation angle;
correcting the first interpolation angle and the second interpolation angle on a basis of the position of the moving body; and
calculating a position of the moving body on a basis of the corrected first interpolation angle and second interpolation angle.

21. The position detection method according to claim 20, wherein the first signal includes two sinusoidal waves having a phase difference of 90° therebetween, and the second signal includes two sinusoidal waves having a phase difference of 90° therebetween.

22. The position detection method according to claim 21, wherein the first interpolation angle is calculated by calculating arctangent 2 of the two sinusoidal waves of the first signal, and
the second interpolation angle is calculated by calculating arctangent 2 of the two sinusoidal waves of the second signal.

23. The position detection method according to claim 20, wherein the first interpolation angle is corrected with a first correction value and the second interpolation angle is corrected with a second correction value on a basis of a table in which the first correction value and the second correction value are recorded in advance, the first correction value being a difference between an actual value and an ideal value of the first interpolation angle, and the second correction value being a difference between an actual value and an ideal value of the second interpolation angle.

24. The position detection method according to claim 20, wherein the first signal is detected by a first signal detection unit, and the second signal is detected by a second signal detection unit.

25. The position detection method according to claim 19, wherein the first signal includes two sinusoidal waves having a phase difference of 90° therebetween, and the second signal includes two sinusoidal waves having a phase difference of 90° therebetween.

26. The position detection method according to claim 25, wherein the position of the moving body is calculated from a difference between a first value and a second value, the first value being obtained by calculating arctangent 2 of the two sinusoidal waves of the first signal, and the second value being obtained by calculating arctangent 2 of the two sinusoidal waves of the second signal.

27. The position detection method according to claim 19, wherein the waveform of the first signal and the waveform of the second signal are corrected on a basis of a plurality of the first correction values and the second correction values obtained by applying a first position of the moving body calculated on the basis of the first signal and second signal before being corrected and a plurality of second positions adjacent to the second position to the table.

28. The position detection method according to claim 27, wherein the waveform of the first signal and the waveform of the second signal are corrected on a basis of an average value of a plurality of the first correction values and an average value of a plurality of the second correction values.

29. The position detection method according to claim 27, wherein the first position and the second position are spaced apart from each other by adjacent slits among a plurality of slits obtained by dividing a moving range of the moving body.

30. The position detection method according to claim 19, further comprising:
further correcting the corrected waveform of the first signal and the corrected waveform of the second signal, on a basis of the first correction value and the second correction value obtained by applying the position of the moving body calculated on the basis of the corrected first signal and second signal to the table.

31. The position detection method according to claim 19, wherein the first signal is detected by a first signal detection unit, and the second signal is detected by a second signal detection unit.

32. The position detection method according to claim 31, wherein the first signal corresponding to a change in light or a change in a magnetic field is detected due to movement of the scale of the first track, and
the second signal corresponding to a change in light or a change in a magnetic field is detected due to movement of the scale of the second track.

33. The position detection method according to claim 19, wherein the moving body rotates around a rotation center.

34. The position detection method according to claim 19, wherein the moving body linearly moves.

35. The position detection method according to claim 19, wherein the scale is configured by a gear shape or a rugged shape provided on the moving body or is configured by alternately magnetizing N poles and S poles.

36. The position detection method according to claim 19, wherein the second track has a scale having cycles smaller by one cycle than the predetermined cycles.

* * * * *